March 9, 1965 B. W. EAVIS 3,172,234
DEVICE FOR PROPAGATING AND GROWING PLANTS
Filed Sept. 30, 1963
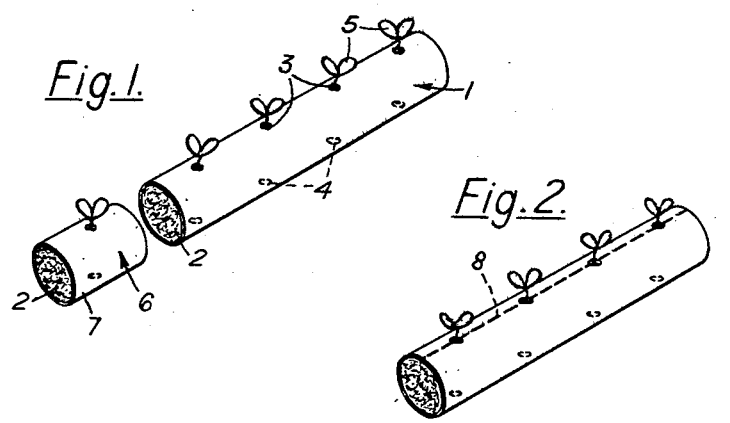
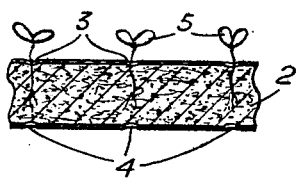
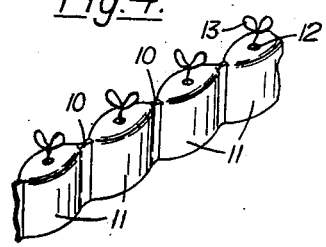
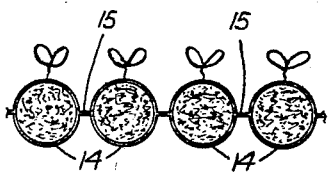
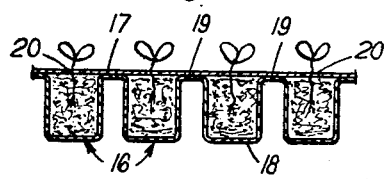
Inventor
BRIAN WYNDHAM EAVIS
By
Kurt Kelman
agent United States Patent Office 3,172,234
Patented Mar. 9, 1965

3,172,234
DEVICE FOR PROPAGATING AND GROWING PLANTS
Brian Wyndham Eavis, Flat 5, Dynevor House, Ampthill, England
Filed Sept. 30, 1963, Ser. No. 312,457
Claims priority, application Great Britain, Oct. 2, 1962, 37,334/62
10 Claims. (Cl. 47—1.2)

This invention relates to a planting device for use in agriculture and horticulture and more particularly for facilitating the growing and propagation of seedlings, vegetables, fruits and other plants.

It is one object of this invention to provide means for use in agriculture and horticulture which enable plants to be grown and cultivated with an efficient use of productive resources available for that purpose.

According to one aspect of this invention there is provided a planting device for use in cultivating plants, such device comprising a tube containing an absorbent rooting medium, the arangement being such that seeds, bulbs, cuttings, seedlings, plants or the like may be inserted or planted in the absorbent rooting medium through holes, slits or other apertures in the wall of said tube, the plants growing through the said apertures and feeding on nutrient provided in or supplied to the interior of such tube.

The said tube may, if desired, be uniform or regular in cross section as, for example, circular, polygonal or any other suitable shape. The tube may moreover be of any desired length and size in cross-section depending inter alia on the type of plant which is to be rooted therein.

If desired, two or more tubes may be provided and may, for example, be combined into a unit in spaced parallel relationship to each other.

In use the tube may be supported in a horizontal, vertical or oblique position as desired.

The said tube may be made of plastics or other water resistant and water proof material and, for instance when the means are used for growing bedding plants, the material is conveniently such that the tube may be severed at selected positions in order to separate one or a number of plants from the remainder. Thus conveniently the said tube is made of polyethylene of a thickness in the range 0.0010" to 0.1".

The said absorbent rooting medium may have some inherent nutrient value, for example, it may comprise soil, or alternatively it may have little or no nutrient value in which case nutrient may be continuously supplied to the rooting medium by liquid feeding.

The said absorbent rooting medium may be formed in a continuous column within the said tube or may be separated into shorter columns which abut one another but are nevertheless separated from one another within the tube.

According to a further feature of the invention, the or each tube may be sealed transversely at selected intervals in order to separate pockets of absorbent rooting medium.

The means of the invention have a wide variety of uses. Thus for example, they may be used for growing and displaying house and bedding plants, by for instance placing a tube with one or more plants rooted therein on a window sill, table or window ledge, in which case the tube is conveniently located on a tray containing water or a nutrient solution.

Another use to which the means of the invention may be put is the handling of bedding plants which may, for example, be grown by commercial growers or nurserymen using the means and method of the invention and then sold, the number of plants purchased being severed from the tube or prepared previously as a prepack, the purchaser thereafter being able to subdivide the tube and to plant out individual plants as required.

The means of the invention thus lends itself to self-service and avoids the soiling of the hands of the shop assistant or customer. The roots of the plant are effectively protected and disturbance during planting out is minimised.

It will be appreciated that the outside of the tube may be printed in order to display a brand name and/or the name or variety of the plants rooted therein.

A still further use to which the means of the invention may be put is in the production of crop plants. Thus, for example, the means of the invention may be used for the raising of seedlings or rooting of cuttings prior to planting out in a field or glasshouse border.

It is a further object of the invention to provide a method of growing crops and according to another aspect of the invention, such method comprises providing a tube filled with absorbent rooting medium, sowing seeds or the like at spaced intervals in the tube, permitting the seedlings, plants or the like to become rooted in the tube, severing the tube to divide therefrom individual plants or groups of plants and planting out the latter.

Whilst the planting out may be done by hand, nevertheless conveniently in the case of crops the planting out is effected by suitable machinery, for example, a standard planting machine.

In order that the invention may be more readily understood, several embodiments thereof will now be described by way of example and with reference to the accompanying drawings in which:

FIGURE 1 is a perspective view of one embodiment of the means of the invention showing plants being grown therewith, FIGURE 2 is a perspective view of a second embodiment of the means of the invention showing plants being grown therewith, FIGURE 3 is a longitudinal section through the means of FIGURE 1, FIGURE 4 is a perspective view of a third embodiment of the means of the invention showing plants being grown therewith, FIGURE 5 is an end view showing a plurality of the tubes of FIGURE 1 combined into a unit; and FIGURE 6 is a similar view to that of FIGURE 5 but showing a modified arrangment.

In the embodiment shown in FIGURE 1, the means of the invention comprises a non-rigid tube 1 of opaque waterproof plastics material containing an absorbent rooting medium 2 comprising a mixture of equal parts of peat and sand into which fertilizer has been incorporated.

The tube is provided with a row of apertures 3 in its top face and further apertures 4 are provided in the base face of the tube through which water may be absorbed when the tube is placed on a wet or moist surface.

Conveniently the means of FIGURE 1 are prepared by taking a perforated or apertured "layflat" tube of suitable length (say 3') and diameter (say 1½"), formed from a polyethylene of 250 gauge (0.0025") thickness. One end of the tube is heat sealed and the tube is filled with the absorbent rooting medium by hand or preferably by means of a suitable machine, for example of the sausage filling machine type. Alternatively plastic sheets may be fed off a reel and be formed into a tube by heat sealing the longitudinal edges of the sheet together, the absorbent rooting medium being simultaneously introduced into the tube. Machines for automatically packaging products and which are suitable for use in manufacturing the means of the invention are known and do not form part of the present invention.

Once the tube containing the absorbent rooting medium has been made, seeds or plants are inserted by hand or by any convenient precision seed drill through the apertures 3 into the absorbent rooting medium 2. It will be appreciated that if desired the sowing of the seeds etc. may serve also to provide the apertures.

A number of tubes similarly prepared are then placed together in a glasshouse or other suitable environment on a waterproof floor which may be flooded periodically in order to keep the absorbent rooting medium moist by reason of water absorbed through the apertures 4.

As the plants increase in size, the tubes may be spaced further apart from each other, no thinning out or transplanting being required.

In an alternative arrangement, the tubes may be supported vertically, for example suspended from a horizontal wire, in which case they are conveniently watered from above.

When the plants 5 have become established in the tube and have reached the required size individual plants may be severed from the remainder, each portion 6 of the tube being complete with its covering material 7 (see FIGURE 1).

If desired, of course, groups of two or more plants may be separated from the rest and the tube portions may be placed in plastic trays or the like for sale as window boxes, or packed in boxes from which convenient numbers of plants may be removed for sale as bedding plants.

Crop plants may be utilised by subdividing the tube so that individual plants may be planted in the field by hand or by using any standard planting machine. It is also envisaged that the plants may be fed into a machine designed to separate individual plants from the remainder in the tube, and to plant these individual plants in selected positions in the ground.

In the embodiment shown in FIGURE 2, the tube is longitudinally perforated as indicated at 8 to enable the covering material 9 to be separated from the rooted portions of the plants by tearing it along such perforations.

As indicated in FIGURE 3, the absorbent rooting medium 2 is provided in a continuous column.

In a modified arrangement (not illustrated) the absorbent rooting medium is in the form of short columns abutting each other.

In the third embodiment (see FIGURE 4), the tube is sealed transversely by integral partitions 10 to provide a number of separate pockets or sachets 11, each containing a column of absorbent rooting medium, and each having an aperture 12 for a plant 13.

Whilst the tubes may be entirely separate from each other, nevertheless conveniently and in order to facilitate handling and production, they are combined into units. Thus as shown in FIGURE 5, a number of tubes 14 may be arranged in horizontal spaced relationship with respect to each other and be connected by webs 15.

FIGURE 6 shows a modified arrangement in which the planting device comprises a series of substantially rectangular section tubes 16 arranged in parallel spaced arrangement with respect to each other to form a unit. Such a construction can conveniently be formed from two sheets 17 and 18 of thermoplastic material heat sealed together along parallel lines using for example a former having a plurality of upwardly directed vertical ribs so as to form integral webs 19 connecting the tubes 16. In such a case the absorbent rooting medium may conveniently be provided by a sheet of fibrous material having seeds sown therein, such sheets of absorbent rooting medium being laminated between the two sheets 17 and 18, apertures 20 in the upper sheet permitting the growth of plants from the seeds.

It will be appreciated that the method and means of the invention permit the minimisation of production costs by an efficient use of labour and materials and facilitate mechanisation.

I claim:
1. In a planting device, in combination:
   (a) a continuous elongated tube of frangible, water resistant, and substantially water-proof material,
      (1) said tube having an axis and two faces on opposite sides of said axis,
      (2) said tube being formed with an axial row of spaced openings in each of said faces; and
   (b) an absorbent rooting medium in said tube and substantially filling the same.
2. In a device as set forth in claim 1, said rooting medium constituting an axially elongated column substantially coextensive with said rows of openings.
3. In a planting device as set forth in claim 1, said tube being of substantially circular cross section transverse of said axis.
4. In a planting device as set forth in claim 1, said tube being of substantially rectangular cross section transverse of said axis.
5. In a planting device as set forth in claim 1, a plurality of integral partitions axially dividing said tube into a plurality of compartments, an opening of each of said rows communicating with each compartment.
6. In a planting device as set forth in claim 1, said tube being of substantially uniform cross section transverse of said axis.
7. In a planting arrangement, in combination:
   (a) a continuous elongated tube of frangible, water resistant, and substantially water-proof material,
      (1) said tube having an axis and two faces on opposite sides of said axis,
      (2) said tube being formed with an axial row of spaced openings in each of said faces;
   (b) an absorbent rooting medium in said tube and substantially filling the same; and
   (c) a plurality of plants rooted in said medium and projecting outward of said tube through respective apertures of one of said rows.
8. In a planting device, in combination:
   (a) a plurality of continuous elongated tubes of frangible, water resistant, and substantially water-proof material,
      (1) each tube having an axis and two faces on opposite sides of said axis,
      (2) each tube being formed with an axial row of spaced openings in each of said faces thereof;
   (b) an absorbent rooting medium in each tube and substantially filling the same; and
   (c) web means connecting said tubes for substantially parallel alignment of said axes thereof in a common plane, one of said faces of each of said tubes being located on one side of said common plane, and the other face of each tube being located on the other side of said common plane.
9. In a planting device as set forth in claim 8, said web means being integral with said plurality of tubes.
10. In a planting device as set forth in claim 8, said tubes and said web means essentially consisting of two sheets of said material bonded to each other along substantially parallel spaced lines, the bonded portions constituting said web means, and respective portions of said sheets intermediate two of said lines being spaced from each other jointly to constitute one of said tubes.

References Cited by the Examiner

UNITED STATES PATENTS

| 220,896 | 10/79 | Wolferts | 47—56 |
| 1,333,411 | 3/20 | Gray | 47—56 |
| 3,052,062 | 9/62 | Boyle | 47—37 |
| 3,112,577 | 12/63 | Burger | 47—37 |

FOREIGN PATENTS 74,703 9/18 Austria.

T. GRAHAM CRAVER, *Primary Examiner.*